Jan. 12, 1954     H. ARCHER     2,665,517
HOLDING DEVICE FOR FISH LURES
Filed Sept. 6, 1951
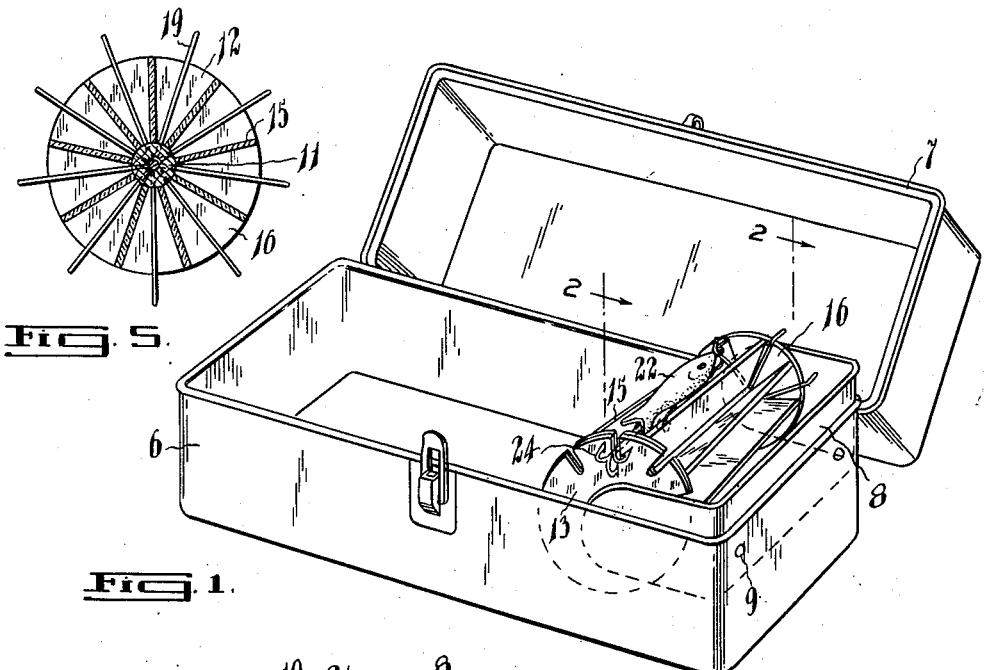
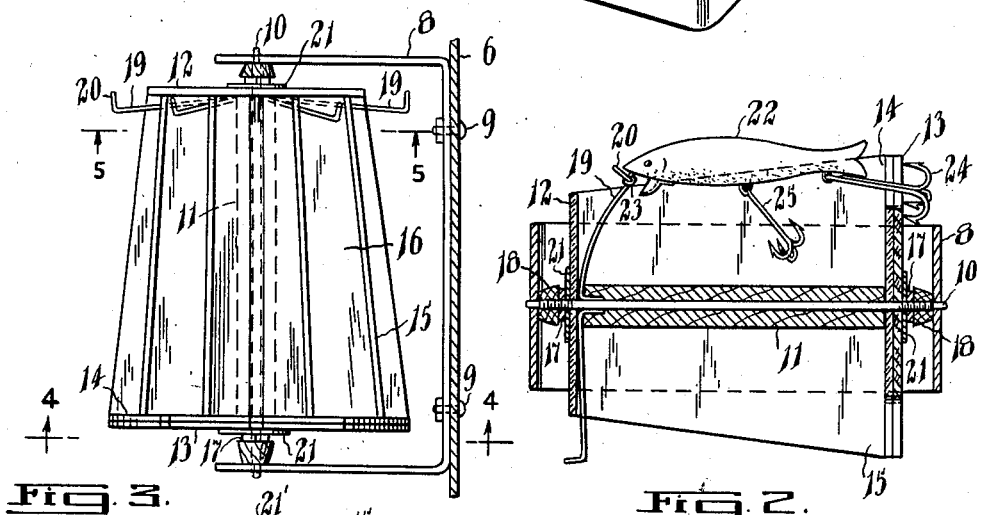
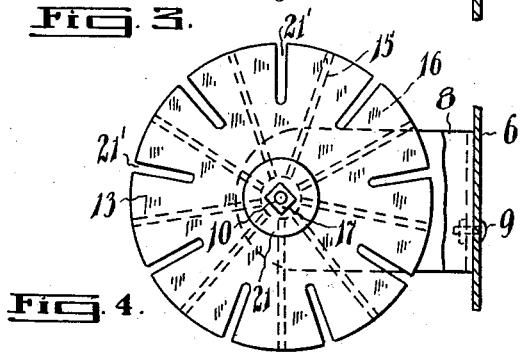
INVENTOR
HENRY ARCHER
By Frederick C. Bromley
ATTY.

Patented Jan. 12, 1954

2,665,517

UNITED STATES PATENT OFFICE 2,665,517

HOLDING DEVICE FOR FISH LURES

Henry Archer, Toronto, Ontario, Canada

Application September 6, 1951, Serial No. 245,295

2 Claims. (Cl. 43—54.5)

It is well known that anglers have considerable difficulty in satisfactorily holding and storing, when not in use, the various types of artificial lures used by them. Such lures usually comprise a body of wood, metal, plastic or other material which may be shaped to imitate a small fish, frog, or other creature, or may be of spoon or other shape. Such bodies usually have a single hook or a plurality of hooks attached to the rear end and often have one or more hooks, or gang hooks attached along the length of the body.

The object of the present invention is to provide a holder or carrier which is particularly adapted to support and store lures of the type referred to above, and which is also adapted to store and support the common type of fish hook comprising a metal hook and a snell of catgut or similar material.

Another object, and an important one, is to so construct the holder that any intermediate hooks on the body of a lure will be protected by the holder from coming into contact with the angler using the holder as well as by becoming entangled with the hooks of other lures in the holder.

A still further object is to mount the holder in a manner such that it may be readily positioned for the insertion of or removal of any lure without interfering with other lures carried by the holder, and in which the lures may be inserted or removed with a minimum of difficulty.

Another object is to devise a holder which will support lures of different lengths and cross sectional sizes and configurations.

These and other objects are attained by means of the constructions hereinafter described and illustrated in the accompanying drawings, in which, Fig. 1 is a perspective view of an angler's box with the improved lure holder mounted therein;

Fig. 2 is a longitudinal section on the line 2—2 in Fig. 1;

Fig. 3 is a plan view of the holder;

Fig. 4 is a section on the line 4—4 in Fig. 3; and

Fig. 5 is a section of the carrier on the line 5—5 in Fig. 3.

In the drawings like numerals of reference indicate corresponding parts in the different figures.

Referring to Fig. 1, 6 indicates a box such as used by anglers to carry fish lures and other appurtenances used in angling, and 7 is the cover hingedly connected therewith.

Within the box at one end is mounted a U-shaped frame 8, the base thereof being secured to the wall of the box by bolts 9. Extending between the legs of the frame is a shaft 10 and on this shaft is mounted a carrier. The carrier comprises a hub 11 and end members 12 and 14. Extending between the end members 12 and 14 are radially directed partitions 15, which form between them wedge-shaped pockets or recesses 16. The hub, the end members and its partitions may be made of plastic or other stiff material, but the member 14 is preferably provided with an outer facing 13 of cork or other softer material into which the point of a hook may sink or penetrate.

On the shaft 10 adjacent the outer face of each end member is a washer 21 while on the shaft is threaded a nut 17 to hold the parts together on the shaft. Spacers 18 are mounted at each end of the shaft to hold the carrier in spaced relation to the legs of the frames.

The end member 14 and facing 13 are provided with aligned radial slots 21' intermediate the partitions 15.

Adjacent the end member 12 there is provided spring arms 19, the inner ends of which are bent to seat in recesses in the hub 11, and the outer ends bent outwardly to form hooks as indicated at 20. These arms are each positioned directly opposite a slot 21'.

The end member 14 is shown as of larger diameter than the end member 12 and the arms 19 are of a length to extend beyond the periphery of said end member 12.

In Figs. 1 and 2 a conventional form of lure is shown in order to illustrate one manner of use of the holder. This comprises a fish-shaped body 22 having a screw eye 23 at one end for attachment to a line when in use. The lure body is shown with a gang hook 24 at its tail end and a gang hook 25 attached to the under side of the body.

To store the lure in the holder, the eye 23 is engaged on the hooked end 20 of the arm 19, and the arm is put under tension by drawing on the gang hook 24 to engage the shank thereof in the corresponding slot 21' when the hook is released the points of the hook 24 engage in the facing 13. The gang hook 25 lies in the pocket 16 below the body and is held in said pocket by the body while the carrier is rotated to insert a lure in or remove one from another pocket. As the spring arms 19 are under tension, they will tend to retain the hook points in engagement with the facing 13, and the lure will, therefore, be securely held in place.

The spacing of the ends 12 and 14 from the legs of the supporting frame must be sufficient to permit rotation of the carrier with the hook portions between them as will be apparent from Fig. 2.

Since the arms 19 extend beyond the periphery of the end member 12, it is a simple matter to engage the hooked ends 20 in the eyes on the lures. If one lure is shorter than another the arms may be bent to a greater extent to accommodate them to the difference in length.

It will be evident, of course, that the pockets will accommodate lures of many different shapes and types, as all that is necessary to support the lure is the engagement of the eye with the spring arm and the engagement of the hook points with the outer facing of the end member 14.

Hooks of the ordinary variety having a catgut snell may be supported by engaging the eye of the snell on the spring arm and the point of the hook with the outer facing of the end member 14.

It will be seen that I have devised a very convenient type of support in which a plurality of lures may be mounted without danger of becoming entangled with one another. It will also be seen that a lure may be inserted in or removed from the holder with a minimum of trouble. As the carrier is rotatably mounted, it is evident that any desired lure may be readily selected for removal without disturbing the other lures carried by it.

What I claim is:

1. A fish lure holder of the type described comprising a rotatably mounted carrier having a plurality of longitudinally extending pockets in its periphery, and means for releasably retaining a lure in each said pocket, said means including a pair of spaced end members, one of greater diameter than the other, and longitudinal partitions connecting said end members, the larger end member having a radially directed slot between each pair of partitions, and a spring retainer adjacent the smaller end member opposite each slot and extending beyond the periphery of the smaller end member.

2. A holder for fish lures and the like comprising a rotatably mounted carrier, said carrier having a plurality of longitudinally extending pockets in its periphery, and means for releasably retaining a lure in each of said pockets, said means including a pair of spaced end members, one of greater diameter than the other, and longitudinal partitions connecting said end members, the larger end member having a radially directed slot between each pair of partitions, and a movable lure supporting member adjacent the smaller end member opposite each slot and extending beyond the periphery of the smaller end member.

HENRY ARCHER.

References Cited in the file of this patent

UNITED STATES PATENTS

| Number | Name | Date |
|---|---|---|
| D. 154,105 | Deskey | June 14, 1949 |
| 589,152 | Baker | Aug. 31, 1897 |
| 742,040 | Kurtz | Oct. 20, 1903 |
| 1,359,668 | Buchenau | Nov. 23, 1920 |
| 1,416,142 | Trumble | May 16, 1922 |
| 1,451,256 | Gardner | Apr. 10, 1923 |
| 1,755,477 | Hunyady | Apr. 22, 1931 |
| 2,225,309 | Lawrence | Dec. 17, 1940 |

FOREIGN PATENTS

| Number | Country | Date |
|---|---|---|
| 18,554 | Great Britain | 1913 |
| 625,556 | Great Britain | 1949 |